United State [15] 3,641,435
Munn [45] Feb. 8, 1972

[54] TELEVISION FREQUENCY STABILIZING SYSTEM

[72] Inventor: Robert J. Munn, Arlington Heights, Ill.
[73] Assignee: Motorola, Inc., Franklin Park, Ill.

[22] Filed: Aug. 7, 1969
[21] Appl. No.: 848,246

[52] U.S. Cl. ..................................325/63, 325/67, 325/134, 325/363, 325/416
[51] Int. Cl. ..........................................................H04b 1/16
[58] Field of Search.......................325/63, 67, 133, 134, 363, 325/416, 417

[56] References Cited

UNITED STATES PATENTS 3,531,722 9/1970 Seibold..................................325/134

*Primary Examiner*—Robert L. Griffin
*Assistant Examiner*—Kenneth W. Weinstein
*Attorney*—Mueller & Aichele

[57] ABSTRACT

A very low-frequency receiver is tuned to a station transmitting a low-frequency standard signal, and this received signal is compared in a phase comparator with a signal divided down from a high-frequency precision reference oscillator at a transmitting station which is to be operated at a predetermined carrier frequency. The output of the precision reference oscillator also controls a gated frequency counter, the input signals to which are obtained from the local oscillator used to provide the carrier at the transmitting station. The frequency counter then provides an indication of the frequency of the transmitted carrier accurately referenced to the received low-frequency standard signal whenever the precision reference oscillator frequency is properly adjusted to produce a nonvarying output from the phase comparator.

4 Claims, 1 Drawing Figure

PATENTED FEB 8 1972
3,641,435
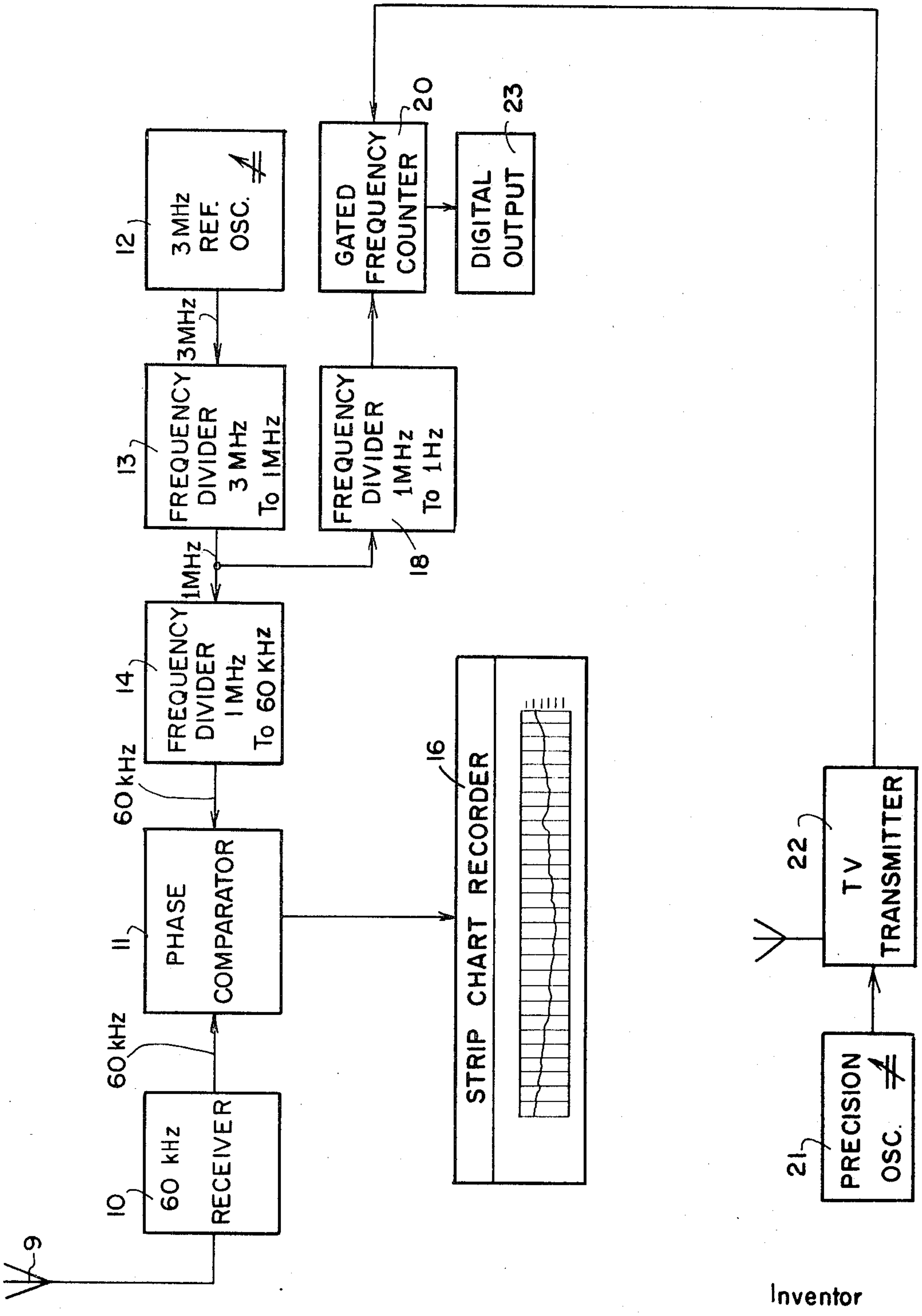
Inventor
ROBERT J. MUNN
BY Mueller, Aichele & Rauner
ATTYS.

TELEVISION FREQUENCY STABILIZING SYSTEM

BACKGROUND OF THE INVENTION

In the operation of radiofrequency transmitting stations, such as television stations, it is necessary to maintain very accurate prescribed frequencies of the assigned carrier wave signals in order to minimize cochannel interference between stations. One method which has been utilized to accomplish this result has been for one television station to use another station for reference and vice versa. While this type of synchronization is adequate within a restricted geographical area, it is impossible to provide a nationwide synchronization of the transmitting stations by such a method.

Another method which has been used has been to utilize a standard high-frequency signal which is divided down to a frequency which may be transmitted over a telephone line, and then to use this telephone-transmitted frequency as a reference at the transmitter station for adjusting the local transmitter oscillator. This system, however, is subject to the imperfections of the telephone line transmission and does not provide the high precision which is desirable in a frequency stabilization system.

As a consequence, it is desirable to provide a frequency stabilization system which permits television stations to precisely measure and maintain very accurate frequencies (within one cycle) on a nationwide basis.

SUMMARY OF THE INVENTION

Accordingly it is an object of this invention to provide an improved frequency stabilization system.

It is another object of this invention to provide a means for maintaining an accurate frequency standard at a transmitting station.

It is a further object of this invention to adjust the frequency standard at a transmitting station by phase comparing a signal divided down from a high-frequency reference oscillator with a low-frequency standard signal transmitted from a station providing accurate low-frequency signals.

It is a further object of this invention to maintain an accurate frequency standard at a transmitting station and to utilize this frequency standard to control a gated frequency counter in order to precisely measure the transmitted carrier frequency.

In accordance with a preferred embodiment of this invention, the output of a precision local standard oscillator is divided down to produce a signal which may be compared with a received low-frequency standard signal; and the output of the comparator circuit provides an indication of the frequency difference between the local precision oscillator and the received standard signal. When the output of the comparator circuit indicates correspondence of frequency of the two signals applied to its input, the output of the precision oscillator is utilized to provide gating pulses to a gated frequency counter for measuring the frequency of the carrier transmitted by the transmitting station. The output of the counter then is a direct indication of the transmitter frequency relative to the low-frequency standard; and the transmitter frequency may be adjusted accordingly, until the output read from the counter indicates the correct relationship for the transmitter.

BRIEF DESCRIPTION OF THE DRAWING

The sole FIGURE of the drawing is a block diagram of a preferred embodiment of the invention.

DETAILED DESCRIPTION

Referring now to the drawing, there is shown a frequency stabilization system which may be utilized to provide television stations or the like with a means for precisely measuring and maintaining very accurate prescribed frequencies, thereby resulting in minimum cochannel interference between stations.

The system shown in the drawing includes a very low frequency radio receiver 10 which may be tuned to receive a standard frequency signal of the type transmitted by the National Bureau of Standards radio station WWVB or some other station operating in the very low frequency range to produce a stabilized standard frequency signal. The signals for the receiver 10 are obtained from an antenna 9; and for purposes of illustration, assume that the receiver 10 is tuned to the 60 kHz. signal of station WWVB. The output of the receiver 10 is a 60 kHz. signal which is applied as one input to a phase comparator 11.

A frequency standard for the local transmitting station is provided by a high precision oscillator 12 operating at 3 MHz. This oscillator may be of any desired type such as the Motorola S–6073. Since the frequency of the operation of the oscillator 12 is substantially higher than the frequency of the output of the receiver 10, a frequency divider 13 provides a three-to-one division to produce a 1 MHz. output, which in turn is applied to an additional frequency divider 14 the output of which is the desired 60 kHz. signal. The other input to the phase comparator 11 is then the 60 kHz. output of the frequency divider 14; so that the DC output of the phase comparator 11 may be utilized to provide an indication of the frequency correspondence of the signals applied to the input of the phase comparator 11. If the receiver 10 is tuned to a station providing a different low-frequency signal, the frequency dividers 13 and 14 would be changed in order to provide the same output frequency from the frequency divider 14 as is obtained from the output of the receiver 10.

If the frequency obtained from the output of the frequency divider 14 is precisely the same as the frequency obtained from the output of the receiver 10, the DC output level of the phase comparator 11 is constant, with the particular magnitude of output being dependent upon the phase correspondence between the two signals. On the other hand, if the signals applied to the input of the phase comparator 11 are not of precisely the same frequency, the output of the phase comparator is a varying DC voltage, indicative of the lack of frequency correspondence.

In order to provide a readily usable means for observing the output of the phase comparator 11, this output is supplied to the input of conventional strip chart recorder 16, using a DC controlled marking pen which is moved in a vertical direction in accordance with the DC voltage applied to it from the output from the phase comparator 11. The paper in the strip chart recorder 16 moves from right to left; so that the vertical movement of the pen, corresponding to the changes in the relative phases between the signals applied to the input of the phase comparator 11, provides an indication of these variations in phase.

If the two signals applied to the inputs of the comparator 11 are of precisely the same frequency, the line drawn by the pen on the chart of the strip chart recorder 16 is a straight horizontal line. If the frequencies are not the same, the pen moves up and down in the vertical direction of the chart as shown in the drawing, at a rate determined by the degree of difference in the frequencies of the two signals. By observing the line drawn on the chart of the strip chart recorder 16, an operator can adjust the frequency of the oscillator 12 until the line is substantially horizontal. When this adjustment is made and is observed on the chart of the strip chart recorder 16, the 3 MHz. reference oscillator 12 is accurately adjusted in frequency to a predetermined offset from the standard frequency received by the very low frequency receiver 10.

Once the reference oscillator 12 has been properly adjusted, the output of this oscillator may be utilized to effect the precision measurement of the frequency of the local oscillator used to produce the carrier wave in the television transmitter. To accomplish this measurement, the output of the frequency divider 13 is applied through a further frequency divider 18 to produce a 1 Hz. output signal, which is used as a source of gating pulses to control a gated frequency counter 20 by opening the frequency counter 20 to be responsive to input signals for 1-second intervals. The input to the gated frequency counter 20 is obtained from a low-level test point within a television transmitter station 22, with the test point providing signals at the visual carrier frequency of the transmitter 22. Control of the carrier frequency of the transmitter 22 is obtained from a second precision oscillator 21, operating in the MHz. range and constituting the local oscillator for the transmitter 22.

During the one second interval that the gated frequency counter 20 is opened by the output of the frequency divider 18, the counter stores a signal indicative of the visual carrier frequency of the transmitter 22. A digital output or readout device 23 is provided for the counter 20 and may be in the form of a visual display of the counter output. The information stored in the counter 20 may be read out in a conventional manner. By observing the display of the digital output 23, the operator of the station is provided with a direct reading of the frequency of the visual carrier frequency of the transmitter 22; and if this frequency is either above or below the frequency at which operation should occur, adjustment of the precision oscillator 21 may be effected. Additional readings of the gated frequency counter 20 then may be taken followed by appropriate adjustments of the precision oscillator 21 until the carrier is at the proper frequency. The signals at the visual carrier frequency of the transmitter 22 are used instead of monitoring the output signals of the oscillator 21 directly, since the carrier frequency is substantially higher than the oscillator frequency (e.g., the carrier may be 55.25 MHz. with oscillator 21 at 4.6 MHz.), thereby permitting better resolution to be obtained with the system.

It should be noted that the 3 MHz. reference oscillator 12 may be adjusted to within 1 or 2 parts in $10^{10}$ of the NBS low-frequency signal. When the frequency divider 18 provides an output signal of 1 Hz. so that the counter gate is opened for one second, the second precision oscillator 21 may be set to the desired frequency ± the nearest Hz. If the gate of the gated frequency counter 20 is set to a 10-second interval by an additional frequency divider responsive to the output of the divider 18, the frequency of the transmitter may be adjusted to ± the nearest 10th Hz. or $1.8\times10^{-9}$.

Adjustment of either of the precision oscillators 12 or 21 does not affect the other; so that as frequency corrections are made on the local frequency standard established by the oscillator 12, the transmitter frequency remains unchanged until it is moved separately with its own control. The local standard oscillator circuit and source of gating pulses for the gated frequency counter 20 may be utilized irrespective of the frequency of operation of the transmitter, so that a given system can provide an accurate reference for a transmitter frequency of any predetermined offset and may be utilized for different offset transmitter frequencies. The strip chart recorder 16 provides a continuous record of the local reference as it is compared with the standard very low frequency signal received by the station, and the chart may be stored by the station as a frequency log of its own standard reference oscillator 12.

Although the system has been described as an open loop system with manual adjustment of the frequency of the oscillator 12, the output of the phase comparator 11 could be used as a feedback signal to control the frequency of the oscillator 12 automatically.

I claim:

1. A system for indicating the frequency of a carrier wave, including in combination:

means for receiving a standard signal of a predetermined frequency;

a first adjustable frequency oscillator;

comparator means having first and second inputs for comparing signals applied thereto to provide an output indicative of a frequency difference between said signals;

first circuit means coupled with the means for receiving the standard signal and the output of the first oscillator for deriving therefrom first and second signals corresponding to the outputs of the first oscillator and the receiving means, respectively;

means for applying the first and second signals to the first and second inputs of the comparator means, adjustment of the frequency of the first oscillator to a predetermined frequency relative to the standard frequency causing the first and second signals to be of predetermined relative frequencies, the output of the comparator means indicating the frequency difference between the signals applied to the first and second inputs;

a strip chart recorder coupled with the output of the comparator means and providing a predetermined visual indication when the comparator means output is indicative of said predetermined relative frequencies of the first and second signals applied thereto;

a gated frequency counter rendered operative by gating signals applied thereto;

a source of signals, the frequency of which is to be measured;

means for applying the signals from the source of signals to the counter; and means including a frequency divider coupled with the output of the first oscillator and responsive to the output thereof for supplying gating signals to the gated frequency counter at a predetermined frequency which is low relative to the frequency of signals from the source of signals, a first one of such low-frequency gating signals operating to open the frequency counter to initiate a count therein and a second one of such low-frequency gating signals operating to close the counter to terminate the operation thereof, whereupon the frequency counter stores a count indicative of the number of cycles of the signal from the source of signals which are applied to the input of the counter during the period of time between the first and second gating signals applied thereto, and the stored count further being indicative of the frequency relationship between the source of signals and the received standard signal with the strip chart recorder providing said predetermined visual indication.

2. The combination according to claim 8 wherein the received standard signal has a low frequency, with the first oscillator providing output signals at a frequency substantially higher than the frequency of the standard signal, and wherein the first circuit means includes frequency divider means coupled to the first oscillator and operates to divide the frequency of the first oscillator down to match the frequency of the received standard signal to comprise said predetermined relative frequencies, with the received standard signal and the divided-down first oscillator signal being applied as the input signals of the comparator means.

3. The combination according to claim 2 wherein the output of the frequency counter is a digital output.

4. The combination according to claim 1 wherein said predetermined visual indication is a straight line, the frequency counter has a digital readout, and the frequency of the gating pulses is selected to provide a direct indication of the frequency of the signals from the source of signals when such straight line indication is provided by the strip chart recorder.

* * * * *